United States Patent
Kahlon et al.

(10) Patent No.: US 6,962,135 B2
(45) Date of Patent: Nov. 8, 2005

(54) USE OF INTEGRATED STARTER ALTERNATOR TO PREVENT ENGINE STALL

(75) Inventors: Gurinder S. Kahlon, Canton, MI (US); Ning Liu, Novi, MI (US); Robert J. Mohan, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/066,228

(22) Filed: Jan. 31, 2002

(65) Prior Publication Data

US 2003/0140880 A1 Jul. 31, 2003

(51) Int. Cl.$^7$ .............................................. F02N 17/00
(52) U.S. Cl. .................................................. 123/179.3
(58) Field of Search ........................ 123/179.3, 339.14, 123/339.16, 339.17, 339.18, 179.28

(56) References Cited

U.S. PATENT DOCUMENTS

| | | | | |
|---|---|---|---|---|
| 4,721,083 | A | * | 1/1988 | Hosaka ........................ 477/111 |
| 5,323,743 | A | * | 6/1994 | Kristiansson ............ 123/179.3 |
| 5,998,881 | A | | 12/1999 | Wind et al. |
| 6,233,935 | B1 | | 5/2001 | Kahlon et al. |
| 6,299,563 | B1 | | 10/2001 | Shimasaki |
| 6,322,476 | B1 | | 11/2001 | Kahlon et al. |
| 6,380,701 | B1 | | 4/2002 | Kahlon et al. |
| 6,453,864 | B1 | * | 9/2002 | Downs et al. ............ 123/179.3 |
| 6,561,336 | B1 | * | 5/2003 | Huart et al. ........... 123/179.28 |

FOREIGN PATENT DOCUMENTS

| | | |
|---|---|---|
| EP | 0 142 100 A2 | 10/1984 |
| EP | 1 106 824 A1 | 6/2001 |

* cited by examiner

*Primary Examiner*—Henry C. Yuen
*Assistant Examiner*—Arnold Castro
(74) *Attorney, Agent, or Firm*—Brinks Hofer Gilson & Lione

(57) ABSTRACT

In one aspect of the invention, a system for preventing stall of a vehicle engine is provided. The system includes an integrated starter alternator operably connected with the engine. The integrated starter alternator is capable of selectively operating as a starter motor for transmitting torque to the engine and as an alternator for producing electric energy. The system also includes at least one electric energy storage device in electrical communication with the integrated starter alternator. The system further includes at least one controller in electrical communication with the integrated starter alternator. The system includes at least one sensor operably connected with the engine sending a signal indicative of engine performance to the controller. The controller compares the signal to a predetermined condition indicative of engine stall and controls the electric energy storage device and the integrated starter alternator to transmit a torque to the engine sufficient to prevent engine stall.

17 Claims, 4 Drawing Sheets

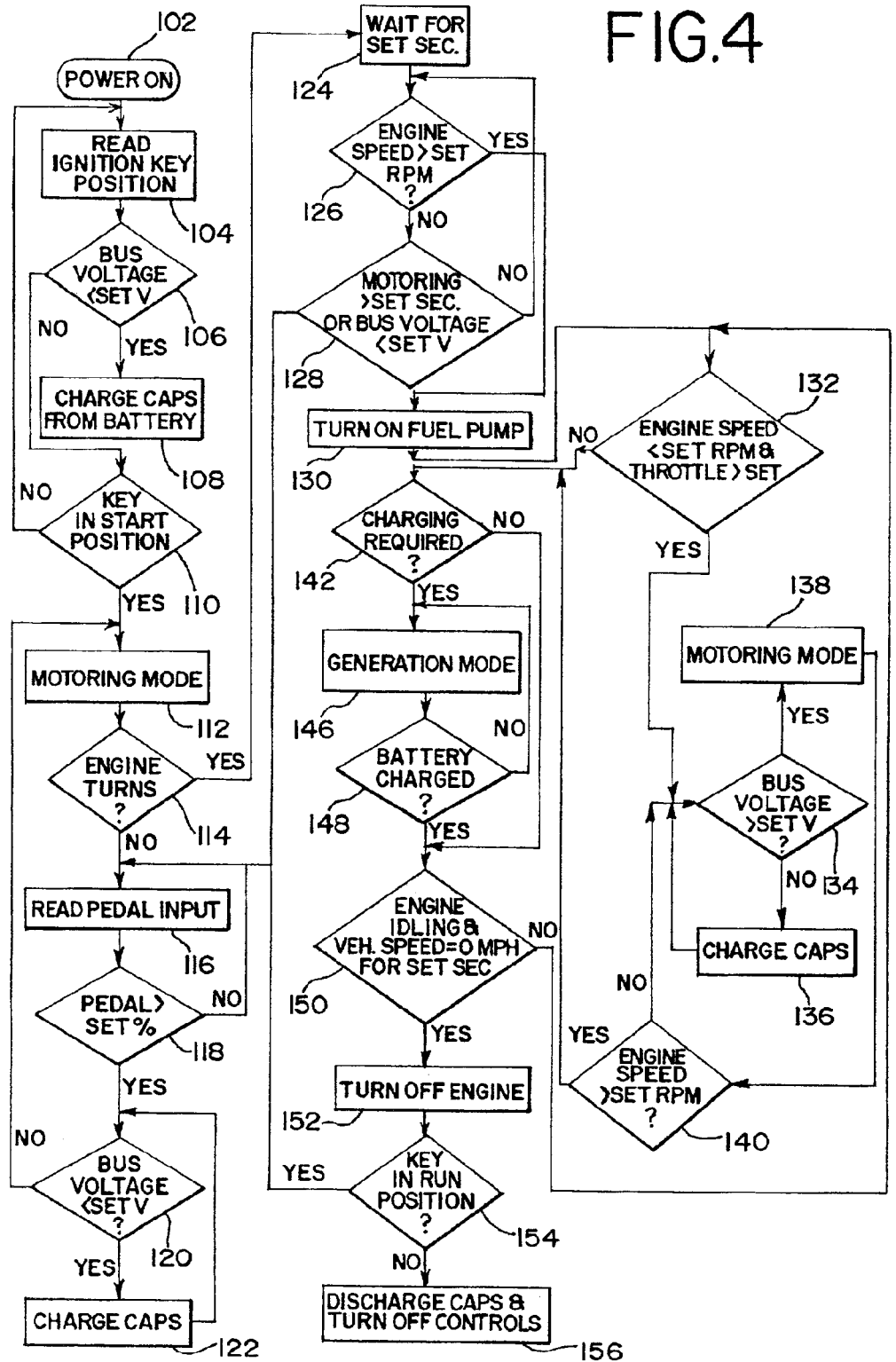

USE OF INTEGRATED STARTER ALTERNATOR TO PREVENT ENGINE STALL

FIELD OF THE INVENTION

The present invention relates generally to an apparatus and method for preventing engine stall in a vehicle. More particularly, it relates to an electronic control system that uses an integrated starter alternator to prevent the engine from stalling.

BACKGROUND

It is well known that a vehicle engine may stall under driving conditions that impose a heavy load on the engine. For example, engine stall may occur while driving the air conditioner compressor, the radiator fan, the power steering pump and the alternator for generating electric power to operate accessories such as car audio systems and air conditioner blowers.

In a conventional control system for preventing engine stall, engine parameters, including engine speed, and other operating conditions of automotive components affecting engine operation are monitored and checked against patterns known to lead to engine stall. When the engine operating parameters match or closely correlate predetermined patterns for engine stall, the control system performs a stall-preventive operation. In a known stall-preventive operation, additional torque is provided to the engine by means of an auxiliary device which is driven by a power source other than the engine itself.

Those skilled in the art will recognize that a conventional starter motor can be used as an electric motor to provide additional engine torque via an electromagnetic clutch. A disadvantage of using such a conventional starter motor to prevent engine stall is the complexity associated with the hysteresis operation necessary to prevent hunting in the starter motor operation. Additionally, a stall-preventive control system using a conventional starter motor to prevent engine stall includes a separate alternator to charge a vehicle's battery and source its electrical loads. This imposes additional costs and under-the-hood fit and function obstacles.

Similarly, an alternator can be used as an electric motor to drive the engine via a power transmission belt stretched between the alternator pulley and a pulley attached to the engine output shaft. A disadvantage of using a conventional alternator is that it requires a belt tensioning system. Moreover, a separate starter motor is necessary to crank the engine during ignition.

In the area of vehicle electrical systems, there continues to be a need for an electronic control system with fewer major assemblies to prevent engine stall. What is needed is a cost-effective system for preventing engine stall that fits comfortably under the hood of a vehicle.

SUMMARY

In one aspect of the invention, a system for preventing stall of a vehicle engine is provided. The system includes an integrated starter alternator operably connected with the engine. The integrated starter alternator is capable of selectively operating as a starter motor for transmitting torque to the engine and as an alternator for producing electric energy. The system also includes at least one electric energy storage device in electrical communication with the integrated starter alternator. The system further includes at least one controller in electrical communication with the integrated starter alternator. The system includes at least one sensor operably connected with the engine sending a signal indicative of engine performance to the controller. The controller compares the signal to a predetermined condition indicative of engine stall and controls the electric energy storage device and the integrated starter alternator to transmit a torque to the engine sufficient to prevent engine stall.

In another aspect of the invention, a method for preventing stall of a vehicle engine is provided. The method includes measuring at least one engine parameter relating to engine performance. The method also includes detecting an engine condition known to lead to engine stall by comparing the engine parameter to a predetermined value. The method further includes powering an integrated starter alternator from an electric energy storage device to apply additional torque to the vehicle engine when the engine stall condition is detected.

BRIEF DESCRIPTION OF THE DRAWINGS

FIG. 4 is a flowchart for a method of using an integrated starter alternator to prevent engine stall in accordance with the present invention.

DETAILED DESCRIPTION OF THE PREFERRED EMBODIMENTS

While traditional automotive electrical systems utilize a 14-volt power architecture, a new generation of vehicle electrical systems has switched to a 42-volt electrical systems, tripling existing vehicle voltage for both battery output (12 volts to 36 volts) and generator output (14-volt to 42-volt). The 42-volt standard has made possible the development and integration of additional technologies for vehicles, including an integrated starter alternator that combines a starter motor and alternator function in one device. An integrated starter alternator enables faster starting of a vehicle and "stop-and-go" strategies for improved fuel consumption and reduced emissions in city driving. Also, cold start emissions are reduced due to increased engine speed during starting. In addition, the water pump, air conditioning compressor and power steering can be driven electrically, without belts, so they can be electronically controlled for greater efficiency. Moreover, integrated starter alternator systems are smaller and lighter than arrangements using separate starter motors and alternators.

Figure 1:
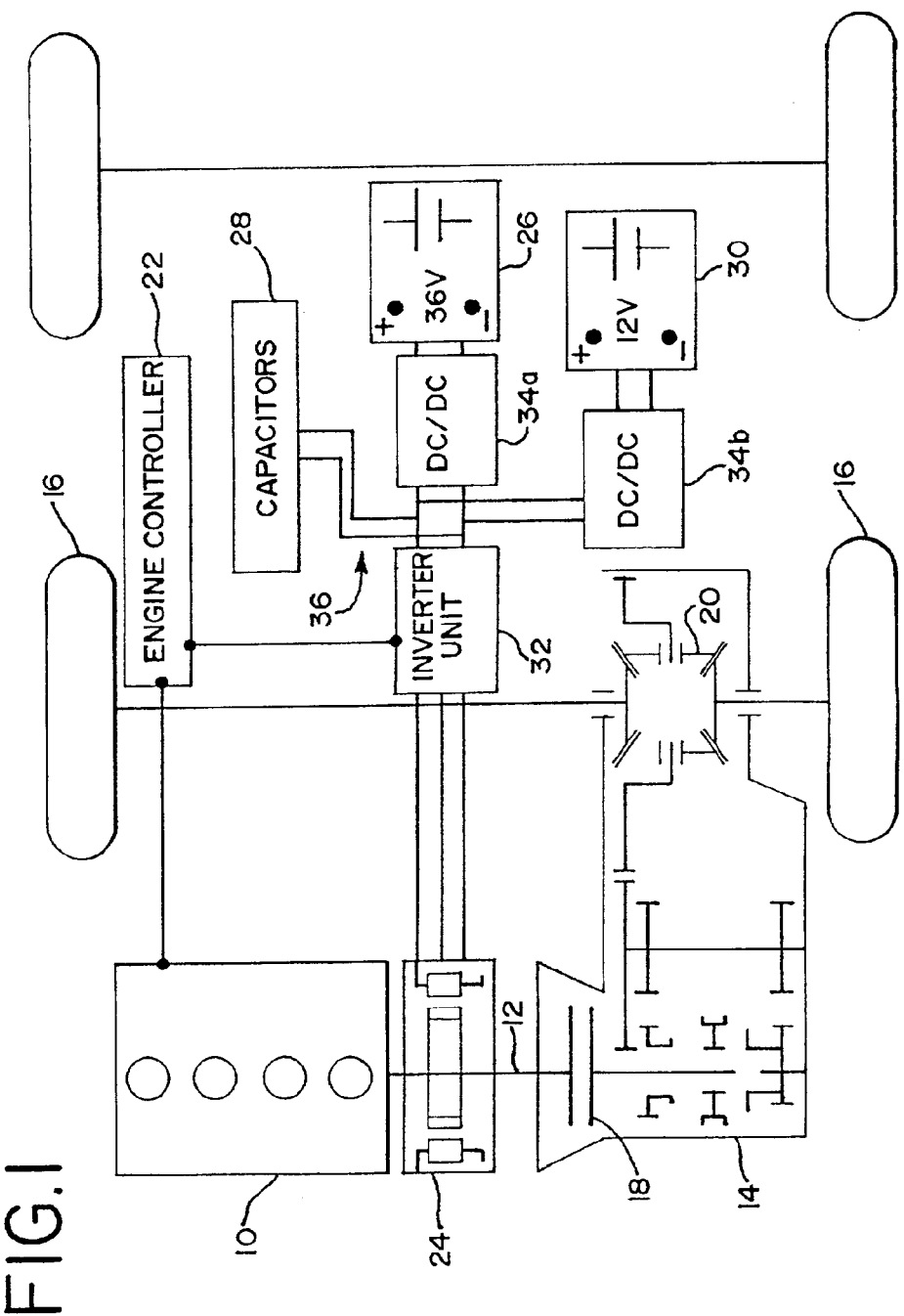
FIG. 1 is a block diagram of a vehicle system utilizing an integrated starter alternator to prevent stall in accordance with the present invention.

Referring now to the drawings, FIG. 1 is a schematic block diagram showing an overall vehicle system utilizing a preferred embodiment of the present invention. The vehicle system includes an engine 10 with an engine crankshaft 12, a transmission 14 and a set of drive wheels 16. The engine crankshaft 12 is coupled to the transmission 14 via a coupling device 18. For example, the engine 10 may be a conventional internal combustion engine disconnectably coupled to a manual transmission via a clutch mechanism or fluidly coupled to an automatic transmission via a torque converter. The transmission 14 is operatively connected to the drive wheels 16 through a differential gear mechanism 20 for transmitting the driving torque produced by the engine 10 to the drive wheels 16, as is well known in the art. An engine controller 22 controls the operation of the engine 10.

The vehicle system further includes an integrated starter alternator (ISA) 24, which can function either as an electric motor or as an alternator generating AC electric power for sourcing electrical loads. The ISA 24 could use any electrical motor technology, including, for example, induction or permanent magnet technology. One ISA that has been found useful is the Integrated Starter Alternator manufactured by Visteon Corp. of MI, USA, which is capable of generating up to 20 kW of power at 42-Volt. In the present embodiment, the ISA 24 has a rotor that is preferably mounted directly on the engine crankshaft 12 between the engine 10 and the coupling device 18. The ISA 24 includes a stator that is bolted between the bell housing of the engine 10 and the transmission 14. Accordingly, the ISA 24 may be energized to crank the vehicle engine 10 like a conventional starter motor before fueling of the engine begins and to assist the torque output of the engine 10 after the engine is started. Also, this mechanical arrangement for the rotor and stator of the ISA 24 eliminates the need for a conventional flywheel from the engine crankshaft 12 because the ISA 24 directly starts the engine 10 and the rotor's mass compensates for the mass of the flywheel. Those skilled in the art will readily recognize that the ISA 24 may be connected to the engine crankshaft 12 in alternative ways, for example, via a mechanical rotation transmitting device such as a chain drive, a belt drive or a gear train.

In the present embodiment, capacitors 28 are used to energize the ISA 24 to drive it as an electric motor. One configuration for the capacitors 28 that has been found useful includes three ultra capacitor modules rated at 100-volts, 1-F capacitance each from Pinnacle Research Institute Inc. of CA, USA. The three 100-volt, 1-F ultra capacitors are connected in series. When each ultra capacitor is fully charged to about 100 volts, the combination of the three ultra capacitors in series provides 300-volt power sufficient to energize the ISA 24 to crank the engine 10 to a designated speed during a cold start or restart of the engine. The capacitors 28 can also supply electrical energy to the ISA 24 sufficient to drive it as an electric motor to assist the torque output of the vehicle engine 10 when the engine is running under its own power. Those skilled in the art will recognize that other types of electric energy storage devices may be used instead of the capacitors 28, such as the Nickel Metal Hydride (Ni-MH) battery pack modules manufactured by Panasonic EV Energy Co., Ltd. of Matsushita Electric Corporation Of America for electric vehicles.

In order to charge the capacitors 28, a primary battery 26 is provided. The primary battery 26 is preferably a 36-volt battery and more preferably a 36-volt lead-acid battery of the type commonly used in 42-volt electrical vehicle systems, although other types of automotive batteries capable of driving the ISA 24 may be used. The primary battery 26 also powers the vehicle's 42-volt electrical loads using a DC—DC converter (not shown). The present embodiment also includes a second battery 30 preferably having a lower voltage capacity than the primary battery 26 and more preferably a 12-volt capacity. The battery 30 can power lower 14-volt loads traditionally found in automotive electrical systems using a DC—DC converter (not shown).

The batteries 26 and 30 and the capacitors 28 can be recharged if needed through the regenerative action of the ISA 24 selectively operating as a high voltage alternator after the vehicle engine 10 has been started. Those skilled in the art will recognize that the 12-volt battery 30 could alternatively recharge from a smaller separate 14-volt alternator rather than the ISA 24.

In order to transmit electric energy between the ISA 24, the batteries 26 and 30 and the capacitors 28, the present embodiment includes an engine bus 36 comprising electrical power lines connecting these components, an inverter unit 32 and a pair of bi-directional DC—DC converters 34, as shown in FIG. 1.

Figure 2:
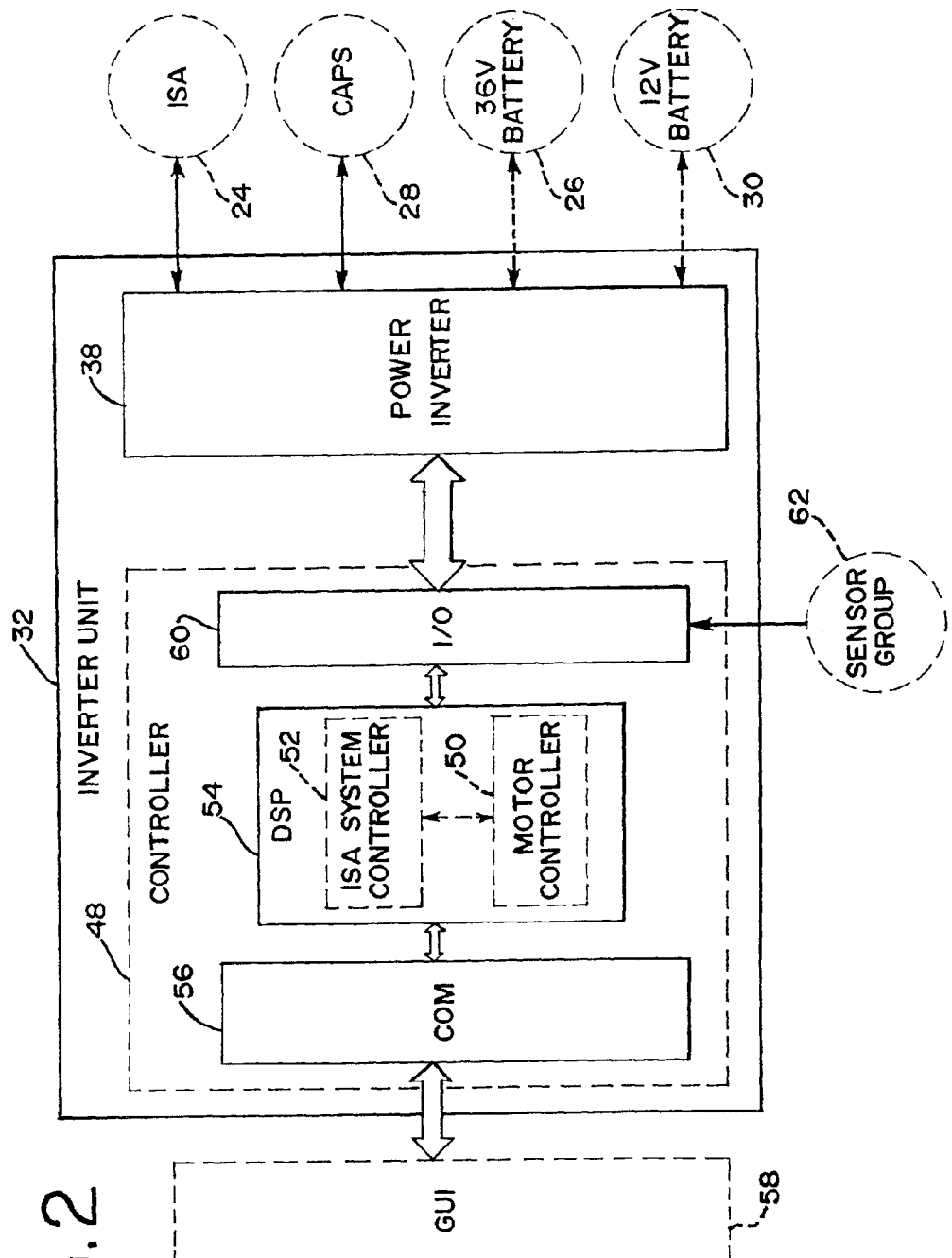
FIG. 2 is a block diagram of an inverter unit of the vehicle system of FIG. 1.
Figure 3:
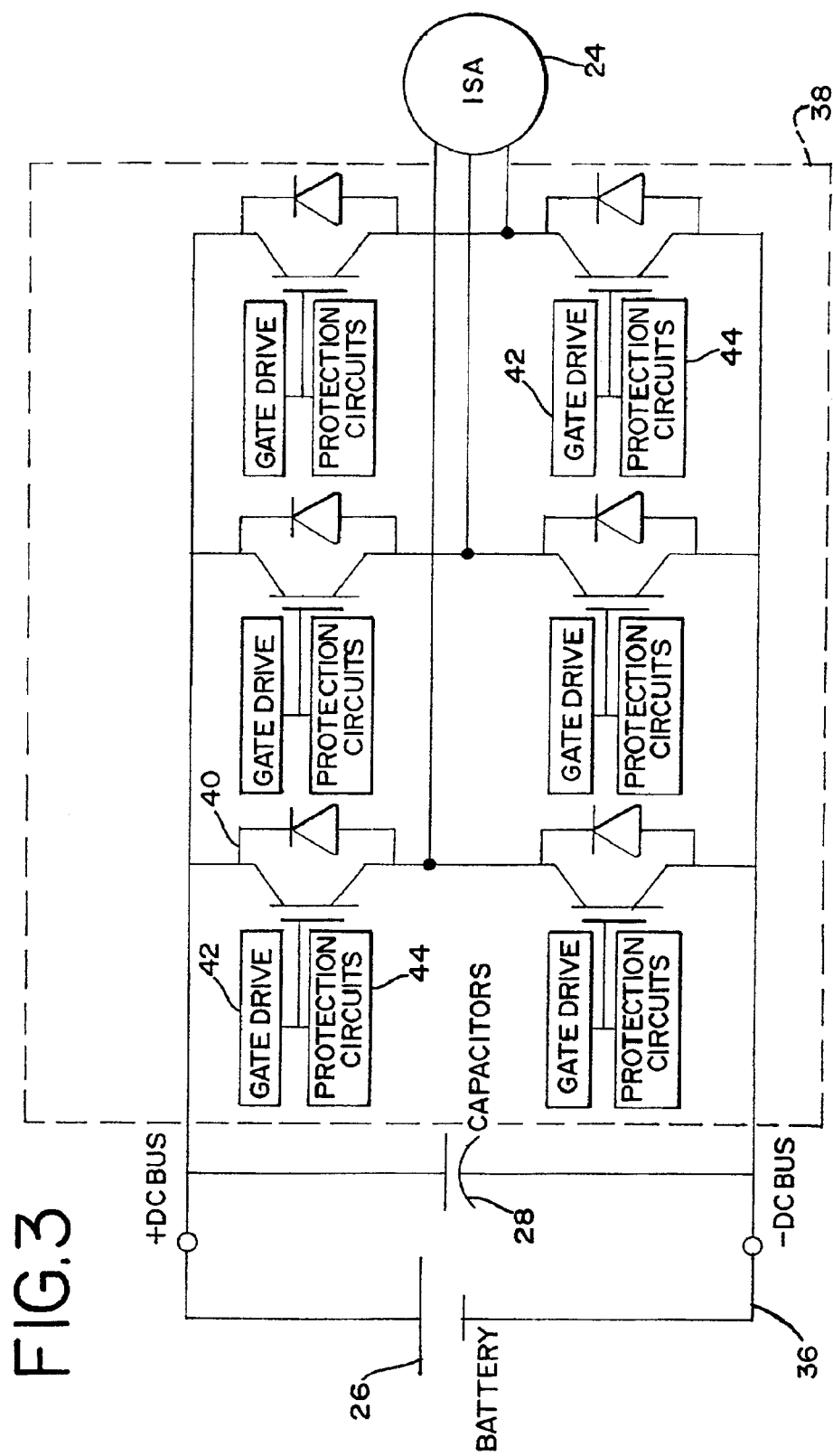
FIG. 3 is a schematic of a power inverter of the inverter unit of FIG. 2.

Referring next to FIGS. 2–3, the inverter unit 32 includes a power inverter 38 comprising a 3-phase bridge 40, gate driver circuits 42 and protection circuits 44. The power inverter 38 can invert 300-volt DC power from the capacitors 28 into three-phase AC power for energizing the ISA 24 to drive it as an electric motor. In addition, when the ISA 24 functions as an alternator, the power inverter 38 can rectify the alternating current generated by the ISA into 300-volt DC power for charging the batteries 26 and 30 and the ultra capacitors 28.

The bidirectional DC—DC converter 34a converts the 300-volt DC output of the power inverter 38 into 36-volt power for recharging the 36-volt primary battery 26. In addition, the DC—DC converter 34a converts the 36-volt output of the battery 26 to 300-volts for recharging the capacitors 28. Likewise, the DC—DC converter 34b converts the 300-volt DC output of the power inverter 38 into 12-volt power for recharging the 12-volt battery 30.

The inverter unit 32 also includes a controller 48, as show in FIG. 2. The controller 48 functionally implements a motor controller 50 for controlling the operation of the ISA 24. The controller 48 also implements a system controller 52 that interfaces with the motor controller 50 and the engine controller 22 and sets various commands for the operation of the overall vehicle system, including commands for preventing stall of the engine 10, as further described below in connection with the control strategy for using the ISA 24 to prevent engine stall.

Preferably, the controller 48 includes a high-performance floating-point digital signal processor (DSP) 54 that executes control logic for implementing the functionality of the motor controller 50 and the system controller 52. One DSP that has been found useful is the 16-bit fixed-point DSP model TMS340F243 from Texas Instruments. The controller 48 also desirably includes a communication processor 56 that performs tasks for debugging and testing the control algorithms implemented on the digital signal processor 54. The communication processor 56 allows an operator to use a graphical user interface (GUI) 58 to communicate with the controller 48 during testing and debugging of the control algorithms. The controller 48 further includes an input/output (I/O) module 60, such as a programmable logic device or programmable array logic, to off load some of the computational work performed by the digital signal processor 54. The digital signal processor 54 issues commands to the ISA 24 and the engine controller 22 through the I/O module 60. The I/O module 60 also receives sensory inputs from sensors on the vehicle system for processing by the digital signal processor 54. Those skilled in the art will recognize that the controller 48 alternatively may utilize other types of microprocessors or computers with sufficient processing capabilities to implement the motor controller 50 and the system controller 52 through algorithms or hard-wired control logic.

The vehicle system is provided with a sensor group 62 in sensory communication with the I/O module 56 of the controller 48 for detecting vehicle operating conditions, as shown in FIG. 2. The sensor group 62 preferably contains a vehicle speed sensor 64, such as an encoder mounted on the shaft of differential gear 20, for measuring the moving speed of the vehicle. The sensor group 62 may also include a motor speed sensor 66, such as an encoder mounted on or near the engine crankshaft 12 or on or near the shaft of the ISA 24 connected directly with the engine crankshaft 12, for measuring the rotational speed of the engine 10 and the ISA 24. The sensor group 62 may further include a throttle pedal sensor 70 for measuring the distance traveled by the throttle pedal 68 of the vehicle system when the pedal is depressed by an operator and an ignition key position sensor 72. Additionally, a battery voltage sensor 74 for measuring the voltage level on the engine bus 36 of the vehicle system containing the ISA also forms part of the sensor group 62.

Referring next to FIG. 4, a method 100 for controlling the vehicle system to prevent engine stall using the ISA according to the present embodiment will be explained. The vehicle system electrically powers up 102 when an operator inserts the ignition key and turns it to a power on position. At that point, the power inverter unit and all of the sensors in the sensor group are powered up. After power up, the controller reads the position of the ignition key 104 based on the input from the ignition key position sensor 72. The controller then compares the voltage level on the electrical bus with a predetermined threshold voltage value 106 to ensure that the capacitors are sufficiently charged to drive the ISA. If the bus voltage falls below the threshold value, the controller commands the power inverter to charge the capacitors from the primary battery until the bus voltage reaches the threshold voltage 108. Once charging of the capacitors is complete, the controller verifies the ignition key is in the start position 110 for a cold start of the vehicle or returns to read the position of the ignition key 104.

Next, the controller commands the ISA into a motoring mode 112, which includes instructing the power inverter to route power from the ultra capacitors to drive the ISA to crank the engine. With the ISA energized, the controller then checks that the engine is turning 114 by verifying that the motor speed sensor measures an engine speed greater than about zero RPM.

If the engine is not turning, then the controller reads the position of the throttle pedal 116 from the throttle pedal sensor input. The controller then waits until the throttle pedal has been depressed a predetermined amount 118. After the controller verifies whether the bus voltage is below a predetermined threshold voltage value 120, the controller commands the power inverter to charge the capacitors from the primary battery 122 until the bus voltage reaches the threshold value. Then, the controller commands the ISA into the motoring mode 112 and the control strategy 100 repeats from that point as described above.

However, if the engine is turning with the ISA in motoring mode, the controller waits a predetermined amount of time for the ISA to crank the engine 124 before verifying that the engine has reached a predetermined engine speed designating an engine idling speed 126. If the vehicle speed sensor measures an engine speed below the engine idling speed, indicating that the engine may be stalling, the controller will wait for a predetermined amount of time 128 before checking again whether the ISA has cranked the engine to the engine idling speed 126. But if the engine does not reach the engine idling speed within the predetermined amount of time or if the bus voltage falls below a predetermined threshold voltage value while the controller waits for the engine to reach the engine idling speed 126, then the controller returns to read the position of the throttle pedal 116 and the control strategy 100 continues from that point as described above.

When the vehicle speed sensor measures an engine speed greater than the engine idling speed, the controller commands the engine controller to supply fuel 130 to power the engine. Also, the controller 48 commands the ISA to disengage from motoring mode 130 by instructing the power inverter to stop routing power to the motor. Therefore, the vehicle engine is operating under its own power at this time.

In order to prevent the engine from stalling, the controller monitors the engine speed. If the engine speed falls below a predetermined threshold stall speed while the throttle pedal remains depressed a predetermined amount 132, the controller performs a stall preventive operation. First, the controller verifies whether the bus voltage has dropped below a predetermined threshold voltage value 134 and commands the power inverter to charge the capacitors from the primary battery until the bus voltage reaches the threshold voltage 136. Then, the controller commands the ISA into a motoring mode 138, which includes instructing the power inverter to route power from the capacitors to drive the ISA until the engine speed is greater than the threshold stall speed 140. The motoring mode 138 thus provides added torque to the engine to prevent engine stall. While the present embodiment evaluates the engine speed to determine whether engine stall is imminent, those skilled in the art will recognize that the controller could also monitor other parameters indicative of engine performance, such as engine torque, to compute whether these fall below a predetermined threshold in order to prevent the engine stall.

Next, the controller checks if the primary battery needs charging 142. This operation assures that the primary battery can charge the capacitors if needed during the vehicle restart operation described below. If battery charging is necessary, the controller commands the ISA into a generation mode 146, which includes instructing the power inverter to route power produced by the regenerative action of the ISA, now acting as an alternator, to the primary battery. The controller can set different levels of power generation based on the charging needs of the primary battery. The ISA continues in this generation mode until the primary battery is charged 148.

After the primary battery is charged, the controller checks 150 whether the engine is idling and the vehicle is stopped for more than a predetermined amount of time. If both conditions are satisfied, the controller turns off the engine to save fuel 152 while the vehicle is has stopped moving. Otherwise, the engine controller returns to perform the stall preventive measure 132 described above.

Next, the controller checks whether the vehicle is restarted. First, the controller verifies that the ignition key remains in the start position 154. If the ignition key is in the start position, the controller reads the position of the throttle pedal 116 and waits until an operator pushes the throttle pedal 118 to re-start the engine as described above in connection with the cold start of the vehicle. If the ignition key is no longer in the start position, the controller will discharge the capacitors and turn off the controls for the vehicle system 156.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

We claim:

1. A system for preventing stall of a vehicle engine, said system comprising:
   an integrated starter alternator operably connected with said vehicle engine, said integrated starter alternator capable of selectively operating as a motor for transmitting torque to said vehicle engine and as an alternator for producing electric energy;
   a first electric energy storage device in electrical communication with said integrated starter alternator;
   a second electric energy storage device in electrical communication with said integrated starter alternator and said first electric energy storage device,
   wherein said second electric energy storage device is operative to charge said first electric energy storage device when said integrated starter alternator is operating as an alternator for producing electric energy;
   at least one controller in electrical communication with said integrated starter alternator, and
   at least one sensor operably connected with said vehicle engine sending a signal indicative of engine performance to said at least one controller,
   wherein said controller compares said signal to a predetermined condition indicative of engine stall and controls said first electric energy storage device and said integrated starter alternator to transmit a torque to said vehicle engine sufficient to prevent engine stall.

2. The system of claim 1 wherein said signal indicative of engine performance is selected from the group consisting of crankshaft speed, camshaft speed and output torque.

3. The system of claim 1 wherein said first electric energy storage device is selected from the group consisting of a battery and a capacitor.

4. The system of claim 1 further comprising:
   at least one sensor operably connected with said vehicle engine sending a signal indicative of engine bus voltage,
   wherein said controller compares said signal indicative of engine bus voltage to a first predetermined charge threshold value and controls said second electric energy storage device to charge said first electric energy storage device; and
   at least one sensor operably connected with said second electric energy storage device sending a signal indicative of a charge condition,
   wherein said controller compares said signal indicative of a charge condition to a second predetermined charge threshold value and controls said integrated starter alternator to charge said second electric energy storage device.

5. The system of claim 1 wherein said integrated starter alternator operates as a motor when said vehicle engine is being started and when said vehicle engine is creating torque.

6. A method of preventing stall of a vehicle engine, said method comprising:
   measuring at least one engine parameter relating to engine performance;
   detecting an engine condition known to lead to engine stall by comparing said at least one engine parameter to a first predetermined value;
   measuring at least one charge parameter relating to engine bus voltage;
   providing a first electric energy storage device in electrical communication with a second electric energy storage device;
   powering an integrated starter alternator from said first electric energy storage device to apply additional torque to said vehicle engine when said engine stall condition is detected; and
   charging said first electric energy storage device from said second electric energy storage device when said charge parameter relating to engine bus voltage is less than a second predetermined value and said integrated starter alternator is operating as an alternator for producing electric energy.

7. The method of claim 6 wherein said at least one engine parameter is selected from the group consisting of crankshaft speed, camshaft speed and output torque.

8. The method of claim 6 wherein said first electric energy storage device is selected from the group consisting of a battery and a capacitor.

9. The method of claim 6 further comprising:
   measuring at least one charge parameter relating to said second electric energy storage device;
   detecting an engine condition known to require charging of said second electric energy storage device by comparing said at least one charge parameter relating to said second electric energy storage device to a third predetermined value; and
   driving said integrated starter alternator to charge said second electric energy storage device when said engine condition known to require charging of said second electric energy storage device is detected.

10. The method of claim 6, further comprising:
    powering said integrated starter alternator from said first electric energy storage device to apply torque for starting said vehicle engine;
    cranking said vehicle engine using said integrated starter alternator until said vehicle engine reaches a predetermined engine speed, and
    supplying fuel to said vehicle engine when said vehicle engine reaches said predetermined engine speed,
    wherein said second electric energy storage device charges said first electric energy storage device before starting said vehicle engine.

11. The method of claim 6 wherein said integrated starter alternator operates as a motor when said vehicle engine is being started and when said vehicle engine is creating torque.

12. An apparatus for preventing stall of a vehicle engine, said apparatus comprising:
    means for measuring at least one engine parameter relating to engine performance;
    means for detecting an engine condition known to lead to engine stall by comparing said at least one engine parameter to a first predetermined value;
    means for measuring at least one charge parameter relating to engine bus voltage;
    a first electric energy storage means in electrical communication with a second electric energy storage means;
    means for powering an integrated starter alternator from said first electric energy storage means to apply additional torque to said vehicle engine when said engine stall condition is detected; and
    means for charging said first electric energy storage means from said second electric energy storage means when said charge parameter relating to engine bus voltage is less than a second predetermined value and said integrated starter alternator is operating as an alternator for producing electric energy.

13. The apparatus of claim 12, wherein said at least one engine parameter is selected from the group consisting of crankshaft speed, camshaft speed and output torque.

14. The apparatus of claim 12, wherein said first electric energy storage means is selected from the group consisting of a battery and a capacitor.

15. The apparatus of claim 12, further comprising:

means for measuring at least one charge parameter relating to said second electric energy storage means;

means for detecting an engine condition known to require charging of said second electric energy storage means by comparing said at least one charge parameter relating to said second electric energy storage means to a third predetermined value; and means for driving said integrated starter alternator to charge said second electric energy storage means when said engine condition known to require charging of said second electric energy storage means is detected.

16. The apparatus of claim 12, further comprising:

means for powering said integrated starter alternator from said first electric energy storage means to apply torque for starting said vehicle engine;

means for cranking said vehicle engine using said integrated starter alternator until said vehicle engine reaches a predetermined engine speed; and means for supplying fuel to said vehicle engine when said vehicle engine reaches said predetermined engine speed, wherein said second electric energy storage means charges said first electric energy storage means before starting said vehicle engine.

17. The apparatus of claim 12, wherein said integrated starter alternator operates as a motor when said vehicle engine is being started and when said vehicle engine is creating torque.

* * * * *